May 25, 1965 G. H. DAMON ETAL 3,185,018
METHOD OF FUEL UNIT ASSEMBLY
Original Filed Aug. 18, 1961

INVENTORS
GLENN H. DAMON
JOHN RIBOVICH
JOSEPH A. HERICKES

BY Claude Funkhouser
ATTORNEY

United States Patent Office 3,185,018
Patented May 25, 1965

3,185,018
METHOD OF FUEL UNIT ASSEMBLY
Glenn H. Damon, Arlington, Va., John Ribovich, McKeesport, Pa., and Joseph A. Herickes, Annandale, Va., assignors to the United States of America as represented by the Secretary of the Navy
Original application Aug. 18, 1961, Ser. No. 135,398, now Patent No. 3,118,380, dated Jan. 21, 1964. Divided and this application Mar. 29, 1963, Ser. No. 275,784
1 Claim. (Cl. 86—20)
(Granted under Title 35, U.S. Code (1952), sec. 266)

The invention described herein may be manufactured and used by or for the Government of the United States of America for governmental purposes without the payment of any royalties thereon or therefor.

This application is a division of U.S. Patent No. 3,118,-380 granted January 21, 1964, which patent is a continuation-in-part of application Serial No. 802,260, filed March 26, 1959 which in turn is a division of U.S. Patent No. 3,069,300 granted December 18, 1962.

This invention relates to fuel units suitable for thermal jet engines, such as the turbo jet, and particularly for the ram jet, as well as for force-feed furnaces, rockets, and similar apparatus.

It is customary to use liquid fuel for jet engines, but such use is known to have certain pronounced disadvantages. For example, while liquid fuels have a high energy content per unit weight their relative low densities necessitates large fuel tanks, they tend to burn erratically at high altitudes and, in general, they require complex controls to secure satisfactory regulation of flow. In addition, liquid fuel ram jets have poorer performance than solid fuel ram jets of comparable size, the former requiring approximately twenty percent increase in length and twenty percent increase in weight to secure equivalent net thrust and thrust coefficients.

It is accordingly an object of this invention to provide a solid fuel unit usable for jet engines and the like which is efficient in use as compared to liquid fuels.

A further object is to provide a solid fuel unit which is readily ignitable in the presence of high speed air flow.

An object, also, is to provide a solid fuel unit which, although independent of air flow for ignition, normally requires air flow for complete combustion.

Still other objects are to provide a solid fuel unit which is readily controlled as to rate of combustion and which burns readily upstream from a point of ignition.

An object also of the invention is to provide a fuel element comprising a fuel briquet, a combustible shell and a binding material to form a firm bond between the shell and the enclosed fuel briquet.

Another object of the invention is to provide a composition of matter which will act as a binding material in the fuel element at the interface between the fuel briquet and the combustible shell whereby said binding material prevents tube shrinkage and retards or prevents accelerated peripheral burning in the combustion process.

A further object is to provide a composition of matter which not only acts as a binder to prevent peripheral burning but also acts as a lubricant when the fuel briquet is pressed into the shell thereby facilitating assembly and providing an intimate bond between the shell and briquet.

Other objects and features of the invention will appear on consideration of the following description of the fuel composition and apparatus reference being made to the accompanying drawing in which.

Figure 1:
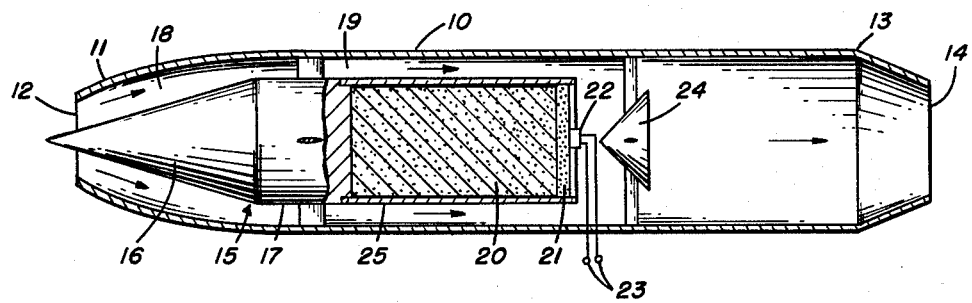
FIG. 1 is a view of a ram jet with a fuel element charge therein.

The arrangement of FIG. 1 includes a cylindrical casing 10 having an entrance section 11 tapered toward the casing axis to form an inlet 12, and an outlet section 13 also tapered toward the casing axis to form a constricted outlet 14 for high pressure fuel gas.

In the upstream end of the casing is an axially positioned diffuser 15 having a conical section 16 and a cylindrical skirt section 17, the cone tip lying forward on the casing axis and the cone surface forming with the entrance section 11 an inlet passageway 18 of progressively decreasing thickness terminating at a point adjoining an annular passageway 19 formed by the casing wall and the cylindrical skirt section 17. Passageway 19 is continued by the space formed between the casing wall and the fuel charge in the form of a solid cylindrical briquet 20 having a diameter equal to that of the diffuser skirt 17 and such length as may meet the purpose of the jet engine. The briquet is encased in a thin shell 25 formed of combustible metal, plastic or paper. Magnesium, being both readily combustible in air and heat liberating, has been found to be particularly useful. The downstream end of the briquet is formed with a terminal layer 21 of igniter material and an electric squib 22 actuated by power from electric power lines 23 is used to kindle the igniter. The igniter material may be identical to the fuel in composition but more loosely compacted so as to permit more rapid heat spread. Increased proportions of oxidants may also be used to increase the burning rate.

Downstream of the charge igniter is a turbulator 24 consisting of a conical mass with its main axis coinciding with the casing axis and its cone point upstream, thus forming a gas flow diverting and mixing element for securing approximately complete combustion of the fuel.

In operation, after the desired airflow in the arrow direction is established, the squib is actuated thus energizing the igniter 21 and igniting the fuel 20 adjacent the igniter. The fuel then burns as a cigarette, moving upstream at a rate predetermined by the quantity of fuel oxidant, the particle size of the oxidant, the compactness of the charge and the composition ingredients of the fuel. Burning particles are blown off the charge mass by the air flow and carried past the turbulator 24 where they are thoroughly mixed with the air to complete combustion. The heated gases are then projected through the constricted outlet 14, thus developing thrust for jet propulsion.

In the use of the described burner, the nature of the fuel becomes an important consideration since it must have high energy content, develop thrust rapidly and function without complete dependence on air flow. A fuel found adequate to these demands may be selected from one of the following compositions, parts by weight being given:

| Material | A | B | C |
|---|---|---|---|
| Aluminum | 37.5 | 55.0 | 15.0 |
| Magnesium | 37.5 | | 45.0 |
| Boron | | 10.0 | 10.0 |
| Potassium nitrate | 17.9 | 25.0 | 21.4 |
| Copper sulphate | 7.1 | 10.0 | 8.6 |

Preferably pyrotechnic aluminum and anhydrous copper sulphate are used. The constituent ingredients are ground to particle size, this being important as affecting efficiency through complete reaction and uniformity in the rate of burning. Particularly, the rate of burning increases with decrease in size of the oxidant particles (potassium nitrate, copper sulphate). The substances are then mixed thoroughly in appropriate equipment and then pressed, as briquets, into the desired forms.

Figure 3:
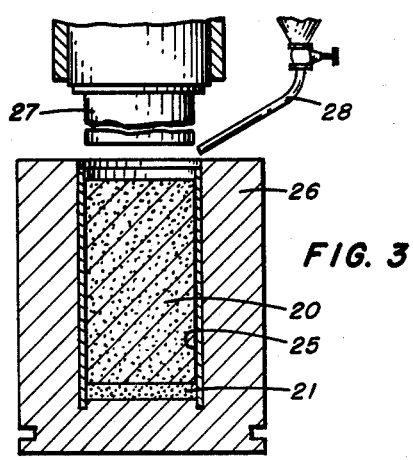
FIG. 3 is a longitudinal section through a mold used for loading the fuel charge of FIG. 1.

As is illustrated in FIG. 3, the fuel unit of FIG. 1 is formed by placing a thin-walled magnesium cylinder 25 in a heavy-walled steel mold 26, which encloses the bottom and sides of cylinder 25 and leaves the top open to receive a hydraulic plunger 27. The thus enclosed magnesium cylinder is coated with a special lubricant composition and then the powdered fuel of approximately minus 200 mesh is fed into the cylinder through tube 28. A hardened steel-tipped plunger 27 is then lowered into the cavity with pressures up to 45,000 pounds per square inch to compress the powder into a solid briquet. Since usually four or more increments of adding powder and compressing are necessary it has been found that the plunger would cause the powder to collect at the wall and form small balls which in some instances would cut through the magnesium, and, moreover, would cause excessive wearing of the plunger sides. Consequently, lubricant had to be swabbed into the cylinder wall after each step of compacting to provide sufficient lubrication in order to mitigate these problems caused by "snowballing."

Another seemingly unrelated problem concerned the peripheral burning at the magnesium shell and fuel briquet interface when the fuel unit was put into service. This peripheral burning is a significant problem since it will cause the unit to burn erratically if not completely explode. Thus, it was necessary to form a tight bond between the shell and fuel briquet in order to reduce this hazard. Consequently, a bonding material was sought which would insure a firm bond without cavities between the fuel and the shell.

However, since this bonding material would have to be applied during the compacting stage it would have to be compatible with the lubricant or better yet capable of acting as a lubricant itself. A composition which fulfilled this dual function of lubricant and bonding agent was found to be plasticized nitrocellulose. A preferred composition is 25 percent by weight of alcohol wet nitrocellulose in 75 percent by weight of plasticizer such as dibutyl phthalate. However, these compositions can vary considerably without deteriorating the results. A preferred range would be 10–40 percent by weight of alcohol wet nitrocellulose and 60–90 percent by weight of a plasticizer. Moreover, in some instances this composition could be mixed with 25 percent by weight of carbon black to obtain the desired improved results.

Consequently, when this composition was used assembly was greatly facilitated and shell damage and plunger wear substantially prevented; and at the same time fuel units exhibited substantially no tendency toward peripheral burning. The plasticized nitrocellulose after performing its lubricant function dried to form a bond that filled the cracks and fissures at the interface which would otherwise act as additional burning surfaces to cause peripheral burning. Consequently, the instant composition and technique successfully eliminates the assembly difficulties and the fuel unit explosion problem.

The significant factor of the fuel compositions is that each is formed of reductants and oxidants, the proportional amounts of reductants and oxidants being non-critical but the oxidant proportions being always less than the stoichiometric value of the compounds produced by the combination of the oxidant and reductant. In other words, both classes of ingredients are required, but the percentage of oxidants depends on the rate of combustion and the thermal energy per unit volume desired, having in mind that air supplies part of the needed oxygen. In general, self-propagation of fuel is obtained with oxidant concentrations as low as 5 percent by weight, with the fastest burning rates occurring in the range of 25 to 35 percent, at all densities.

Figure 2:
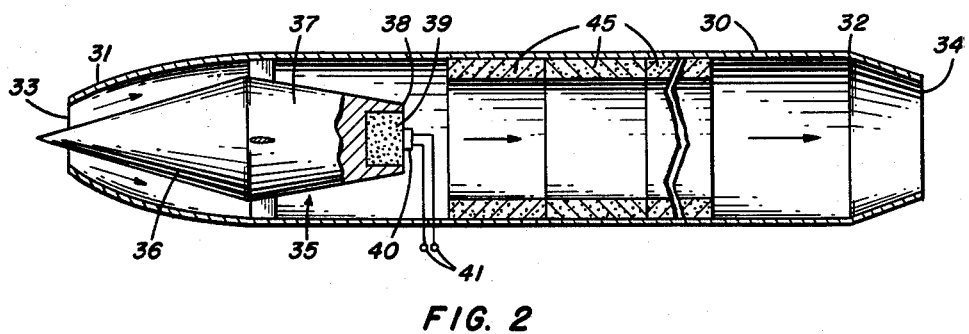
FIG. 2 is a view of a ram jet with a modified fuel arrangement.

While the fuel composition including oxidants and reductants, as hereinabove described, has particular utility in the arrangement of FIG. 1, such compositions are also usable in other arrangements, as shown for example, in FIG. 2 and set out in detail in the copending application of Glenn H. Damon and John Ribovich, Serial No. 423,262, filed April 14, 1954.

In this alternative arrangement the cylindrical casing 30 is fashioned for ram jet use with the constricted inlet and outlet sections 31 and 32, defining the inlet and outlet 33 and 34, respectively. The diffuser 35 is formed with a cone section 36 and a coaxial truncated cone section 37, these sections having abutting bases with the cone section apex upstream and extending beyond the inlet opening, and the truncated section 37 extending a short distance downstream. The downstream end 38 of the truncated section is recessed to receive an igniter 39 composed of a loosely pressed mixture of the fuel material, of the same proportion of oxidants and reductants or of increased oxidants to speed the igniting action.

An electric squib 40, adapted for actuation through power lines 41, kindles the igniter.

Downstream of the igniter is the fuel bed in the form of tubular briquets 45. These briquets are made from oxidants and reductants as in the previously described fuels but differing in the absence of boron and the use of a binder. Typical compositions follow, parts by weight being given:

| Material | D | E |
| --- | --- | --- |
| Aluminum |  | 31.9 |
| Magnesium | 30 | 31.9 |
| Coal | 45 |  |
| Potassium nitrate | 10 | 15.2 |
| Copper sulphate |  | 6.0 |
| Binder | 15 | 15.0 |

The binder may be a plasticized nitrocellulose, rubber cement, asphalt, latex, linseed oil or polymerizable resins. The copper sulphate is anhydrous.

In making the briquets, the finely ground component substances are mixed thoroughly and pressed into form, obtaining densities ranging from about 1.4 to 1.9 gm./cc., in accordance with the particular composition and pressures used. A curing procedure, dependent on the type of binder, is then employed and the briquets are then ready for end to end insertion in the combustion chamber of the casing 30 and to ensure a close bond in order to mitigate peripheral burning it is desirable to use the lubricant described above of plasticized nitrocellulose.

In operation, air is passed through the casing as indicated by the arrows, and at the desired speed of flow the squib is activated to kindle the igniter. Whereupon, burning igniter particles in molten form are caught up by the air-stream and sprayed over the inner surfaces of the briquets igniting the same, the briquets burning radially. The small concentration of oxidant in the fuel promotes rapid ignition and ready propagation of the burning front, while the airstream completes the oxidation of the fuel. Thus, oxygen in both oxidant and air has a necessary function in the combustion of the fuel, as in the modification of FIG. 1.

In describing the invention two structural forms have been indicated with specified substances forming the fuel and igniter. Obviously, modifications and substitutions are available, not only in the structure and materials but in the proportions of substances used. For example, the ratio of oxidants to reductants may be varied over a wide range, self-propagation of burning being secured with oxidant concentrations as low as 5 percent.

In structure, while an outwardly deflecting turbulator is shown in FIG. 1, wall deflectors moving the air into a central fuel stream may obviously be employed. Also, while electric squibs are described as initiators, other devices, such as gas flames, black powder, electric sparks and spontaneous chemical reactions, such as that of glycerin on powdered potassium permanganate ($KMnO_4$), may be used. In additon, the use of a single axial charge in the combustion chamber is illustrative, a bank of parallel small diameter charges being an effective alternative arrangement. Also, the hollow briquet may be used jointly with the solid cigarette type, either in series or the briquet enclosing the other charge. To modify the fuel rate, also, the charge may be in series segments of different specific compositions and burning rates.

Dominant advantages of the fuel systems, as described, include the following items:

By using air as a collateral oxidizing agent in fuel combustion, it is necessary only to employ sufficient oxidants to obtain the desired burning rate, thereby insuring a high thermal fuel capacity.

A pronounced flexibility in control of the fuel burning rate is possible by variation in the proportion and particle size of oxidants in the fuel.

Modifications of the heating unit and compositions other than hereinabove stated may be made and hence no restriction of the disclosure is intended other than may be required by the claims hereto appended.

We claim:

A method for assembling fuel units comprising the steps of enclosing the sides and bottom of a thin-walled, open-end cylinder of combustible material in a heavy walled steel mold, coating the inside of the cylinder with a lubricant-bonding material consisting essentially of 10–40 percent by weight of alcohol wet nitrocellulose and 60–90 percent by weight of dibutyl-phthalate, placing powdered fuel into the cavity formed by the cylinder, compacting the powdered fuel with a close tolerance plunger with pressures up to 45,000 pounds per square inch, withdrawing the plunger, re-coating the remaining height of the cylinder wall, placing additional powdered fuel into the cavity formed by the cylinder, compacting the newly added powdered fuel with a close tolerance plunger with pressures up to 45,000 pounds per square inch, withdrawing the plunger, repeating the last three steps until the fuel unit is filled to the desired level, and allowing the lubricant-bonding material to dry whereby the lubricant-bonding material lubricates the cylinder and the plunger thereby preventing erosion thereof resulting from the adherence thereto of fuel particles and agglomerates, and whereby the lubricant-bonding material fills the interstices on the peripheral surface of the compacted fuel so as to prevent undesirable peripheral burning and bonds the compacted fuel to the cylinder.

References Cited by the Examiner
UNITED STATES PATENTS

| | | | |
|---|---|---|---|
| 1,913,344 | 6/33 | Slusser | 102—98 |
| 2,425,005 | 8/47 | Rechel | 86—30 |
| 3,019,687 | 2/62 | Gongwer | 86—1 |
| 3,028,274 | 4/62 | Winer | 102—98 |
| 3,046,829 | 7/62 | Roemer | 86—1 |
| 3,054,253 | 9/62 | Chung | 102—98 |

BENJAMIN A. BORCHELT, *Primary Examiner.*